United States Patent [19] [11] Patent Number: 4,901,825
Weiler [45] Date of Patent: Feb. 20, 1990

[54] SPOT-TYPE DISC BRAKE INCLUDING CALIPER RETENTION ARRANGEMENTS

[75] Inventor: Rolf Weiler, Frankfurt am Main, Fed. Rep. of Germany

[73] Assignee: Alfred Teves GmbH, Frankfurt am Main, Fed. Rep. of Germany

[21] Appl. No.: 889,215

[22] Filed: Jul. 25, 1986

[30] Foreign Application Priority Data

Sep. 16, 1985 [DE] Fed. Rep. of Germany ....... 3532975

[51] Int. Cl.[4] .................... F16D 65/38; B60T 11/00
[52] U.S. Cl. .................... 188/73.35; 188/370
[58] Field of Search .............. 188/73.43, 73.44, 73.45, 188/73.35, 73.37, 73.36, 73.38, 73.46, 73.47, 71.1, 205 A, 73.1, 370; 192/30 V

[56] References Cited

U.S. PATENT DOCUMENTS

| 3,710,896 | 1/1973 | Machek . | |
|---|---|---|---|
| 3,920,104 | 11/1975 | Hoffman | 188/73.43 X |
| 4,072,215 | 2/1978 | Burgdorf et al. | 188/73.47 X |
| 4,276,965 | 7/1981 | Rickel | 188/73.35 |
| 4,394,891 | 7/1983 | Oshima | 188/73.38 |
| 4,516,666 | 5/1985 | Sheill | 188/73.1 X |
| 4,527,667 | 7/1985 | Courbot . | |

FOREIGN PATENT DOCUMENTS

| 0097418 | 4/1983 | European Pat. Off. . | |
|---|---|---|---|
| 0143941 | 6/1985 | European Pat. Off. . | |
| 2800502 | 7/1978 | Fed. Rep. of Germany . | |
| 2840374 | 3/1980 | Fed. Rep. of Germany . | |
| 2950232 | 5/1982 | Fed. Rep. of Germany . | |
| 3108354 | 9/1982 | Fed. Rep. of Germany . | |
| 3141599 | 9/1982 | Fed. Rep. of Germany | 188/73.1 |
| 3202809 | 8/1983 | Fed. Rep. of Germany | 188/73.31 |
| 3304904 | 8/1984 | Fed. Rep. of Germany . | |
| 3336302 | 4/1985 | Fed. Rep. of Germany . | |
| 2149872 | 3/1973 | France . | |
| 2300935 | 9/1976 | France . | |
| 2354480 | 1/1978 | France | 188/73.36 |
| 2436286 | 4/1980 | France . | |
| 2553165 | 12/1985 | France . | |
| 2039645 | 12/1979 | United Kingdom . | |
| 2039646 | 12/1979 | United Kingdom . | |
| 2147673 | 5/1985 | United Kingdom | 188/73.36 |

Primary Examiner—Robert J. Oberleitner
Attorney, Agent, or Firm—Robert P. Seitter

[57] ABSTRACT

A spot-type disc brake for automotive vehicles, including a brake carrier and a slidable housing and with an arrangement for preventing the brake housing from being lifted clear of its seat is disclosed. The retaining arrangement includes a wire element mounted on the brake housing and forming a projection which engages into or underneath an axially extending recess provided on the brake carrier.

7 Claims, 2 Drawing Sheets

SPOT-TYPE DISC BRAKE INCLUDING CALIPER RETENTION ARRANGEMENTS

BACKGROUND OF THE INVENTION

This invention relates to a spot-type disc brake, and in particular a disc b rake for automotive vehicles.

From the German published patent application DE-OS 3,438,209 a spot-type disc brake is known having two guide arms extending axially over the periphery of the brake disc. For guiding the brake housing in the guide arms, guiding grooves are provided which are engaged by a circumferentially registering shoulder of the brake housing. This arrangement assures not only a secure guiding of the housing but also prevents the housing from unseating itself during a braking action. The shoulder is conventionally formed by milling. Such a milling operation is time and cost intensive and not economically effective.

SUMMARY OF THE INVENTION

It is, therefore, an object of this invention to provide for a spot-type disc brake which is easier to manufacture and thus less costly.

According to a preferred embodiment of the invention there is provided a spot-type disc brake which obviates the necessity to machine the brake housing in order to provide a retention means therefor.

According to an important feature of the invention there is provided a wire element arranged on either or both of the entrance and exit sides of the brake which affords increased flexibility with respect to the mounting position of the brake.

In accordance with an advantageous embodiment of the invention, one wire element each is provided on the entrance and on the exit side, thereby providing a symmetrical arrangement and the desired flexibility with different mounting positions. In accordance with another embodiment of the invention, the two wire elements are interconnected. This can be accomplished advantageously either by a connecting member, or, according to a further embodiment, by constructing the wire element as single piece.

A further advantageous embodiment of the invention provides for engagement of the wire element at least into one bore where it can be removed and mounted easily.

Advantageously, the wire element is adapted to bear against projections on the surface of the brake housing. This arrangement provides a rigid, preloaded connection between the brake carrier and the brake housing.

BRIEF DESCRIPTION OF THE DRAWINGS

The invention will be better understood after reading the following Detailed Description Of The Preferred Embodiment in conjunction with the drawing in which.

DETAILED DESCRIPTION OF THE PREFERRED EMBODIMENT

Figure 1:
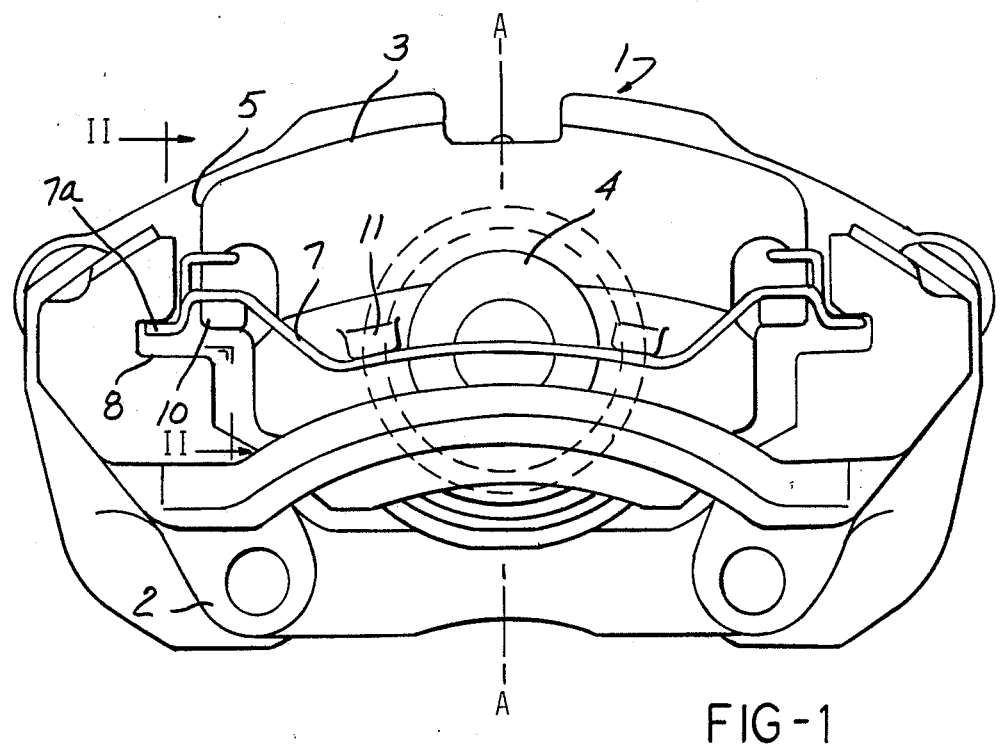
FIG. 1 is a view of a spot-type disc brake showing details of the retaining arrangement of the invention.
Figure 2:
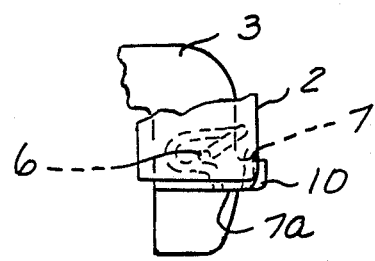
FIG. 2 is a view in section taken along the line II—II of FIG. 1 showing details of construction of the manner in which the wire element is secured in the brake housing.
Figure 3:
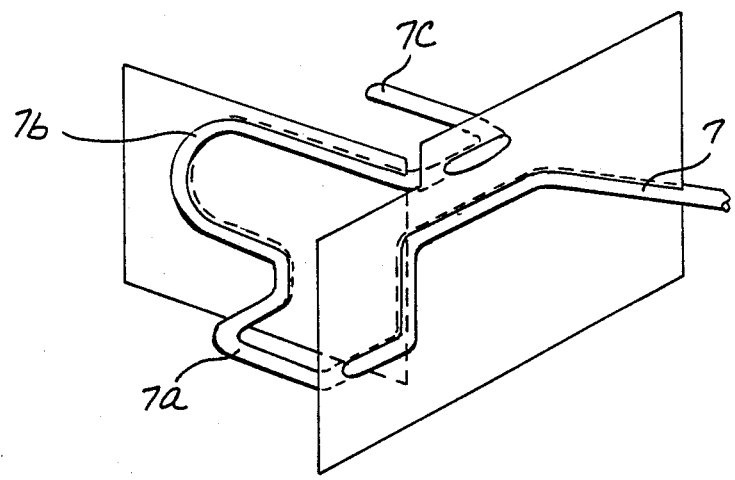
FIG. 3 is a perspective view of part of the wire element.

Referring now to FIGS. 1–3, there is shown a spot-type disc brake 1 including a rigidly secured carrier 2 and a housing 3 slidably carried therein together with an actuating device 4. Positioned symmetrically to the housing center axis A—A, are two circumferentially spaced apart of which is shown in FIG. 2, each adapted to receive an end 7c of a wire element 7. The bores 6 are provided in the region of the non-machined edges 5 at opposite ends of the housing 3. The axis of the bores 6 may be oriented in an angular range of between 5° and 10° relative to the housing normal surface.

After emerging from the housing, the wire element initially extends in the circumferential direction before bending towards the brake disc and forming in a downward arc a U-shaped bend 7b in a plane disposed between the lateral edge 5 of the housing 3 and the corresponding arm of the carrier 2. Turning again downward in the same plane, the wire then bends into a U-shaped projection 7a which is arranged in a plane extending in the circumferential and axial direction and which extends into an axially extending recess 8 of the carrier 2 recess being defined by substantially parallel confining walls. From the projection 7a the wire element, in a plane parallel to the brake disc, extends a small distance upwards in a direction parallel to the housing axis between the carrier and the housing. It is then bent in the direction of the housing axis and bears against the radially outward surface of projection 10 of the housing 3. Beyond projection 10 the wire element angles slightly inward radially, while remaining in the same plane, and passes over into a mid-portion of the spring.

After extending some distance at an angle relative to the housing axis, the wire element is configured to bear against another projection 11. The left-hand portion of the wire element 7 just described repeats itself identically on the opposite side of the housing, thereby resulting in a retaining arrangement disposed symmetrically about the housing axis A—A.

Figure 4:
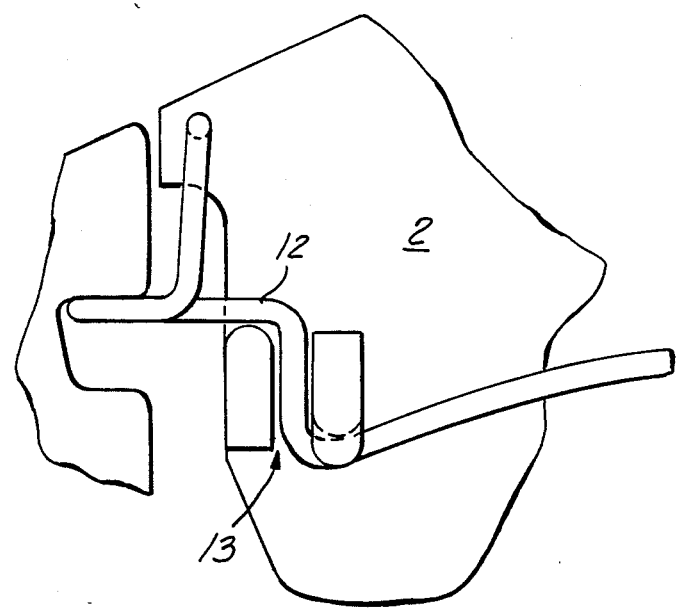
FIG. 4 is a fragmentary sectional view of a spot-type disc brake, showing details of construction of another embodiment of a wire element and its mounting on a brake housing.

It is to be understood that the arrangement of the projections 10 and 11 is not limited to those shown in FIGS. 1 and 2 but they may also be cast integrally with the surface in pairs as shown in FIG. 4, thereby forming a kind of open channel 13 for positive engagement by a wire element 12. The channel is defined by at least two projections arranged in different planes so as to receive the wire element therebetween. The channel 13 may extend in various directions and in particular parallel to the center line of the housing 3, whereby there is provided means for preventing the wire element 12 from being displaced in the circumferential direction.

What is claimed is:

1. A spot-type disc brake for an automotive vehicle, comprising a carrier adapted to be mounted to the wheel suspension of said vehicle, a brake housing slidably mounted to said carrier, said brake housing including two circumferentially spaced apart angularly disposed bores, brake pad actuating means associated with said housing, and a retaining arrangement for preventing the brake housing from being lifted clear of said carrier, said retaining arrangement including a wire element having opposite ends mounted in said angularly disposed bores in the brake housing, said wire element forming at least one projection which engages into at least one axially extending recess provided in the brake carrier, said recess defined by substantially parallel confining walls.

2. The spot-type disc brake as claimed in claim 1, wherein said wire element includes two projections one at an entrance side and one at an exit side of said brake.

3. The spot-type disc brake as claimed in claim 2, wherein the two wire projections are interconnected by a connecting member portion of said wire element.

4. The spot-type disc brake as claimed in claim 2, wherein the two wire projections and said connecting member portion are constructed as a single piece.

5. The spot-type disc brake as claimed in claim 1, wherein the at least one bore is orientated in an inclined position extending in an angular range of between about 5° and 10° relative to a normal surface of said housing.

6. The spot-type disc brake as claimed in claim 1, further comprising at least two projections at a radial outer leg of said housing against which the wire element bears.

7. The spot-type disc brake as claimed in claim 6, wherein the at least two projections are arranged in different planes.

* * * * *